(12) United States Patent
Fix et al.

(10) Patent No.: US 10,990,816 B1
(45) Date of Patent: Apr. 27, 2021

(54) APPARATUSES, SYSTEMS, AND METHODS FOR MAPPING CORNEAL CURVATURE

(71) Applicant: Facebook Technologies, LLC, Menlo Park, CA (US)

(72) Inventors: Alexander Jobe Fix, Seattle, WA (US); Dmitri Model, Fremont, CA (US); Mohammadhossein Daraeihajitooei, Seattle, WA (US); Javier San Agustin Lopez, Menlo Park, CA (US); Mohamed Hegazy, Sammamish, WA (US); Scott Robert Ramsby, Kirkland, WA (US); Sebastian Sztuk, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/400,975

(22) Filed: May 1, 2019

(51) Int. Cl.
*G06K 9/00* (2006.01)
*G06T 7/246* (2017.01)
(Continued)

(52) U.S. Cl.
CPC ..... *G06K 9/00604* (2013.01); *G02B 27/0093* (2013.01); *G02B 27/0172* (2013.01); *G02B 27/0179* (2013.01); *G06K 9/2027* (2013.01); *G06T 7/246* (2017.01); *G02B 2027/0138* (2013.01); *G02B 2027/0178* (2013.01); *G02B 2027/0187* (2013.01); *G06T 2207/10048* (2013.01); *G06T 2207/10152* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2012/0310083 A1* | 12/2012 | Friedman | A61B 3/10 600/431 |
| 2014/0354803 A1* | 12/2014 | Chida | G01B 11/25 348/136 |

(Continued)

OTHER PUBLICATIONS

PHYS-ORG, "New optical component set to revolutionise augmented reality", URL: https://phys.org/news/2014-07-optical-component-revolutionise-augmented-reality.html., Jul. 8, 2014, pp. 1-2.

(Continued)

*Primary Examiner* — Edemio Navas, Jr.
(74) *Attorney, Agent, or Firm* — FisherBroyles, LLP

(57) ABSTRACT

A disclosed computer-implemented method may include directing a display device included in a head-mounted display worn by a user to illuminate, via a projection of a line at an illumination time, a portion of a cornea of the user. The method may further include detecting, via an image sensor at a detection time, a portion of the projection of the line reflected by the portion of the cornea of the user and identifying a distortion of the projection of the line reflected by the portion of the cornea of the user. The method may also include determining a shape of the cornea of the user based on the illumination time, the detection time, and the distortion of the projection of the line reflected by the portion of the cornea. Various other methods, systems, apparatuses, and computer-readable media are also disclosed.

20 Claims, 11 Drawing Sheets

(51) Int. Cl.
*G02B 27/00* (2006.01)
*G06K 9/20* (2006.01)
*G02B 27/01* (2006.01)

(56) References Cited

U.S. PATENT DOCUMENTS

| | | | |
|---|---|---|---|
| 2017/0178375 A1* | 6/2017 | Benishti | G06K 9/4661 |
| 2018/0067306 A1* | 3/2018 | Wilson | H04N 13/332 |
| 2018/0218203 A1* | 8/2018 | Lawson | G06K 9/4628 |
| 2019/0086674 A1* | 3/2019 | Sinay | G02B 27/0172 |

OTHER PUBLICATIONS

Wikipedia, "Foucault knife-edge test", URL: https://en.wikipedia.org/wiki/Foucault_knife-edge_test, as accessed on Apr. 30, 2019, 3 pages.
Wikipedia, "Vertical-cavity surface-emitting laser", URL: https://en.wikipedia.org/w/index.php?title=Vertical-cavity_surface-emitting_laser&oldid=913952274, as accessed on Apr. 30, 2019, 7 pages.

* cited by examiner

APPARATUSES, SYSTEMS, AND METHODS FOR MAPPING CORNEAL CURVATURE

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
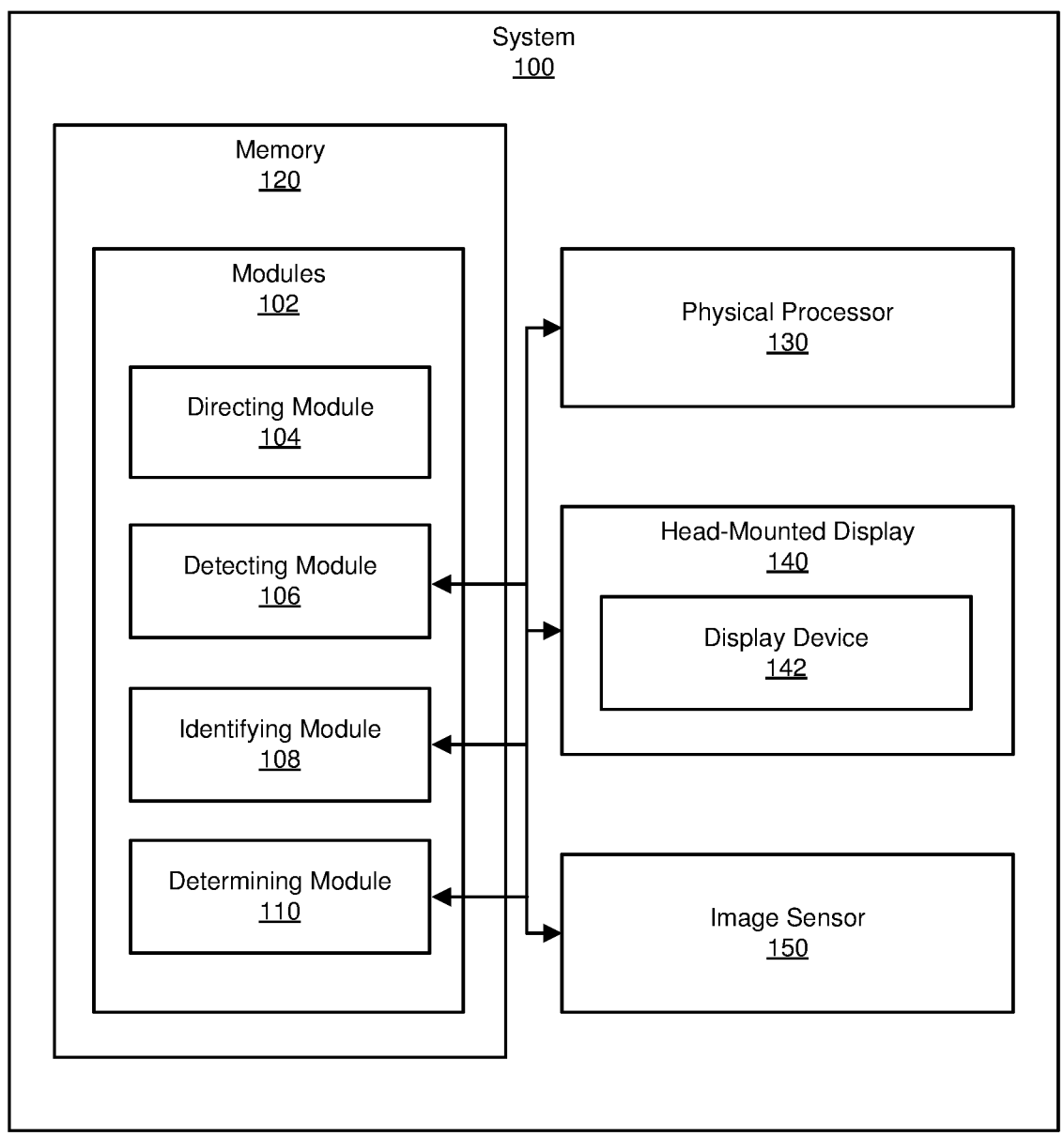
FIG. 1 is a block diagram of an example system for mapping corneal curvature in accordance with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Putting on an artificial reality headset (e.g., a virtual or augmented reality headset) may be the beginning of a thrilling experience, one that may be more immersive than almost any other digital entertainment or simulation experience available today. Such headsets may enable users to travel through space and time, interact with friends in a three-dimensional world, or play video games in a radically redefined way. Artificial reality headsets may also be used for purposes other than recreation. Governments may use them for military training simulations, doctors may use them to practice surgery, and engineers may use them as visualization aids. Artificial reality headsets may also be used for productivity purposes. Information organization, collaboration, and privacy may all be enabled or enhanced through the use of artificial reality headsets.

Unfortunately, conventional artificial reality headsets may have some limitations. For example, conventional artificial reality headsets may be unable to track a gaze of a user, so as to identify an object within a real-world or artificial environment that the user may be looking at during a particular moment. This may reduce or inhibit immersiveness of some artificial reality experiences. Furthermore, conventional artificial reality headsets may be limited in biometric data they may gather that may aid in identification of the user and/or customization of artificial reality experiences.

The present disclosure is generally directed to systems and methods for mapping corneal curvature. As will be explained in greater detail below, embodiments of the instant disclosure may direct a display device included in a head-mounted display worn by a user to illuminate, via a projection of a line at an illumination time, a portion of a cornea of the user. In some examples, the display device may include a rolling-shutter display, and a control device may direct the display device to illuminate the cornea of the user with the projection of the line by directing the rolling-shutter display to illuminate at least one line of pixels along a display axis of the rolling-shutter display. In other examples, the display device may include an infrared light source (e.g., a swept infrared laser) configured to illuminate the cornea via an optical pathway of the display device. In such examples, the control device may direct the infrared light source to illuminate the cornea of the user by directing the infrared light source to pulse the projection of the line in a predetermined pattern (e.g., a line, a set of lines, a grid, etc.).

An example embodiment may also detect, via an image sensor at a detection time, a portion of the projection of the line reflected by the portion of the cornea of the user. In some examples, the image sensor may include a rolling-shutter camera, a global-shutter camera, or an event camera.

The example embodiment may further identify a distortion of the projection of the line reflected by the portion of the cornea of the user and may determine a shape of the cornea of the user based on the illumination time, the detection time, and the distortion of the projection of the line reflected by the portion of the cornea.

By mapping a curvature of a cornea of a user, the apparatuses, systems, and methods described herein may enable an artificial reality system to effectively track a gaze of a user based on observations of movements of the cornea of the user. Furthermore, the apparatuses, systems, and methods described herein may provide a method of identifying users based on the unique shape of the users' corneas. Moreover, the apparatuses, systems, and methods described herein may aid in detection and/or diagnosis of medical conditions related to a shape of a patient's cornea, such as astigmatism, keratitis, keratoconus, and/or a corneal dystrophy.

The following will provide, with reference to FIGS. 1-2 and 4-11, detailed descriptions of systems for mapping corneal curvature. Detailed descriptions of corresponding computer-implemented methods will also be provided in connection with FIG. 3.

FIG. 1 is a block diagram of an example system 100 for mapping corneal curvature. As illustrated in this figure, example system 100 may include one or more modules 102 for performing one or more tasks. As will be explained in greater detail below, modules 102 may include a directing module 104 that may direct a display device included in a head-mounted display worn by a user to illuminate, via a projection of a line at an illumination time, a portion of a cornea of the user.

As further shown in FIG. 1, example system 100 may also include a detecting module 106 that may detect, via an image sensor at a detection time, a portion of the projection of the line reflected by the portion of the cornea of the user and a identifying module 108 that may identify a distortion of the projection of the line reflected by the portion of the cornea of the user. In some examples, example system 100 may also include a determining module 110 that may determine a shape of the cornea of the user based on the illumination time, the detection time, and the distortion of the projection of the line reflected by the portion of the cornea.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate mapping of corneal curvature. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 may also include a head-mounted display 140. In some examples, as will be described in greater detail below, a "head-mounted display" may include any type or form of display device or system that may be worn on or about a user's head and that may display visual content to the user. Head-mounted displays may display content in any suitable manner, including via a display screen (e.g., an LCD or LED screen), a projector, a cathode ray tube, an optical mixer, a waveguide display, etc. Head-mounted displays may display content in one or more of various media formats. For example, a head-mounted display may display video, photos, and/or computer-generated imagery (CGI). Head-mounted display 140 may include a display device 142 that may include any suitable display device as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Various examples of artificial reality systems that may include one or more head-mounted displays may be described in additional detail below in reference to FIGS. 9-11.

As further shown in FIG. 1, in some embodiments, example system 100 may also include an image sensor 150. In some examples, image sensor 150 may include an event camera. In some examples, an "event" may include any change greater than a threshold value in one or more qualities of light (e.g., wavelength, brightness, radiance, polarity, luminance, illuminance, luminous intensity, luminous power, spectral exposure, etc.) received by a pixel included in an event camera during a predetermined period (e.g., 1 µs, 10 µs, 100 µs, 1000 µs, etc.). In some examples, an "event camera" may include any sensor that may asynchronously gather and transmit pixel-level data from one or more pixels in an image sensor array that may detect an event during a particular period of time (e.g., 1 µs, 10 µs, 100 µs, 1000 µs, etc.).

In additional or alternative embodiments, image sensor 150 may include a global-shutter camera. In some examples a "global-shutter camera" may include any imaging device that may scan an entire area of an image sensor (e.g., an array of photosensitive elements or pixels) simultaneously. In additional embodiments, image sensor 150 may include a rolling-shutter camera. In some examples, a "rolling-shutter camera" may include any imaging device that may scan an area of an image sensor (e.g., an array of photosensitive elements or pixels) line-by-line over a period of time (e.g., 60 Hz, 90 Hz, 120 Hz, etc.).

Image sensor 150 may be positioned to receive light reflected by a cornea of a user. Furthermore, image sensor 150 may be communicatively coupled via any suitable data channel to physical processor 130, head-mounted display 140, and/or display device 142. In some examples, image sensor 150 may be separate and distinct from head-mounted display 140. In additional or alternative examples, image sensor 150 may be included in (e.g., integrated within, positioned within, physically coupled to, etc.) head-mounted display 140.

Figure 2:
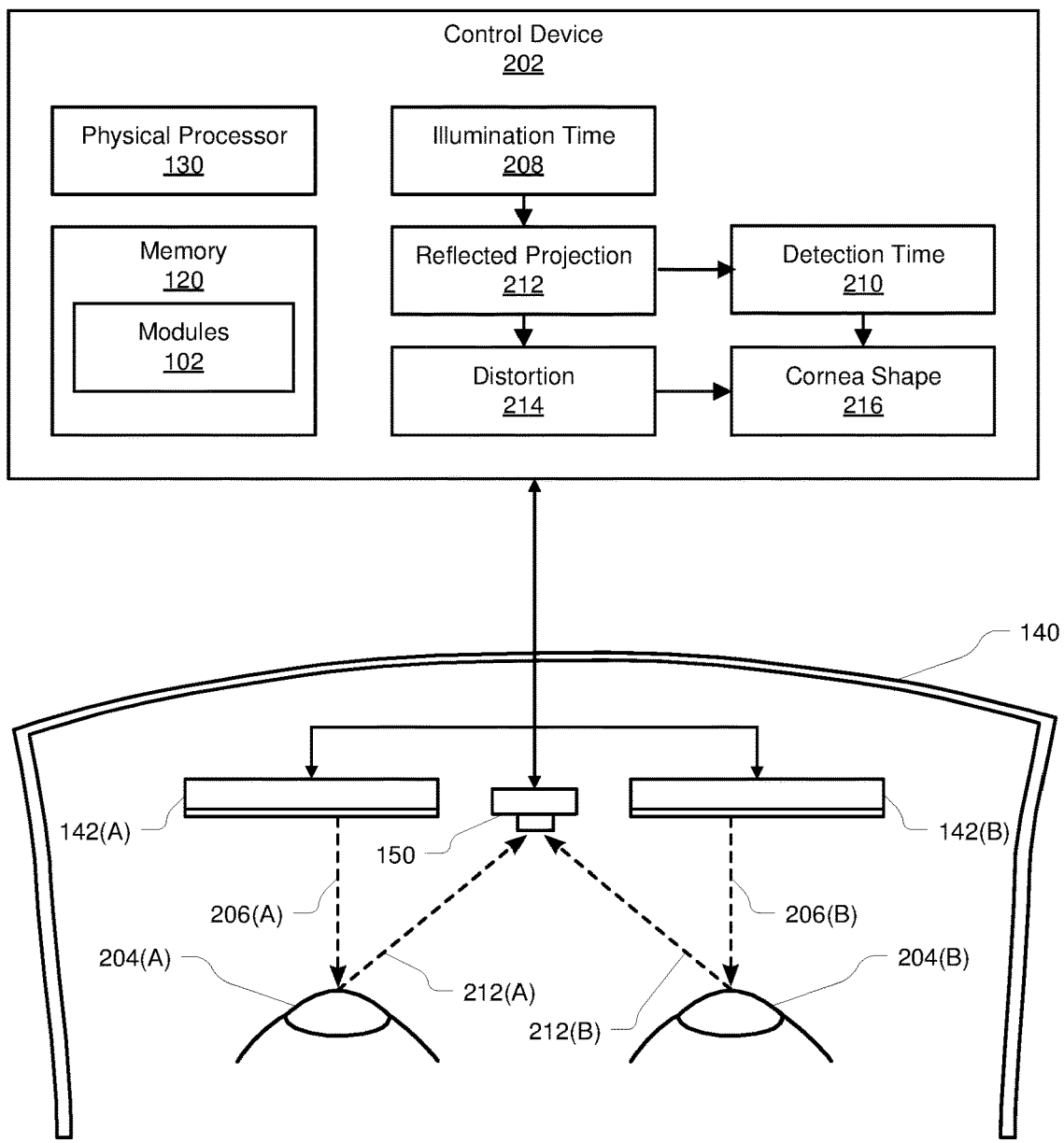
FIG. 2 is a block diagram of an example implementation of a system for mapping corneal curvature in accordance with embodiments of this disclosure.

Example system 100 in FIG. 1 may be implemented in a variety of ways. For example, all or a portion of example system 100 may represent portions of an example system 200 ("system 200") in FIG. 2. As shown in FIG. 2, system 200 may include control device 202. System 200 may also include a head-mounted display 140 that may also include a display device 142 (e.g., display device 142(A) and display device 142(B) in FIG. 2). In some examples, as shown in FIG. 2, head-mounted display 140 may also include image sensor 150. As further shown in FIG. 2, head-mounted display 140 may be worn by a user having at least one cornea 204 (e.g., cornea 204(A) and cornea 204(B)). When the user wears head-mounted display 140, each display device 142 may be positioned to direct and/or project light (e.g., light from at least one of display device 142(A) or display device 142(B)) towards a cornea 204. Likewise, image sensor 150 may be positioned to receive light reflected from the cornea 204.

Hence, when a user wears head-mounted display 140 as shown in FIG. 2, display device 142(A) may illuminate cornea 204(A). Cornea 204(A) may reflect light from display device 142(A) towards image sensor 150, and image sensor 150 may receive light reflected by cornea 204A. Likewise, when the user wears head-mounted display 140 as shown in FIG. 2, display device 142(B) may illuminate cornea 204(B). Cornea 204(B) may reflect light from display device 142(B) towards image sensor 150, and image sensor 150 may receive light reflected by cornea 204(A).

In at least one example, control device 202 may be programmed with one or more of modules 102. In at least one embodiment, one or more modules 102 from FIG. 1 may, when executed by control device 202, enable control device 202 to perform one or more operations to map corneal curvature. For example, as will be described in greater detail below, directing module 104 may cause control device 202 to direct a display device included in a head-mounted display (e.g., display device 142 included in head-mounted display 140) worn by a user to illuminate, via a projection of a line (e.g., projection 206) at an illumination time (e.g., illumination time 208), a portion of a cornea of the user (e.g., cornea 204).

In some embodiments, detecting module 106 may detect, via an image sensor (e.g., image sensor 150) at a detection time (e.g., detection time 210), a portion of the projection of the line reflected by the portion of the cornea of the user (e.g., reflected projection 212). In additional embodiments, identifying module 108 may identify a distortion (e.g., distortion 214) of the projection of the line reflected by the portion of the cornea of the user. Additionally, determining module 110 may determine a shape of the cornea of the user (e.g., cornea shape 216) based on the illumination time, the detection time, and the distortion of the projection of the line reflected by the portion of the cornea. In some further examples, one or more of modules 102 may track a position of the cornea based on the shape of the cornea.

Control device 202 generally represents any type or form of computing device capable of reading and/or executing computer-executable instructions. Examples of control device 202 include, without limitation, embedded systems, wearable devices (e.g., smart watches, smart glasses, etc.), servers, desktops, laptops, tablets, cellular phones, (e.g., smartphones), personal digital assistants (PDAs), multimedia players, gaming consoles, combinations of one or more of the same, or any other suitable computing device. In some examples, control device 202 may be communicatively coupled to head-mounted display 140, display device 142, and image sensor 150. In some examples, control device 202 may be included in (e.g., physically integrated as part of) head-mounted display 140. In additional examples, control device 202 may be physically separate and/or distinct from head-mounted display 140 and may be communicatively coupled to head-mounted display 140, display device 142, and/or image sensor 150 via any suitable data pathway.

In at least one example, control device 202 may include at least one computing device programmed with one or more of modules 102. All or a portion of the functionality of modules 102 may be performed by control device 202 and/or any other suitable computing system. As will be described in greater detail below, one or more of modules 102 from FIG. 1 may, when executed by at least one processor of control device 202, may enable control device 202 to map corneal curvature in one or more of the ways described herein.

Figure 3:
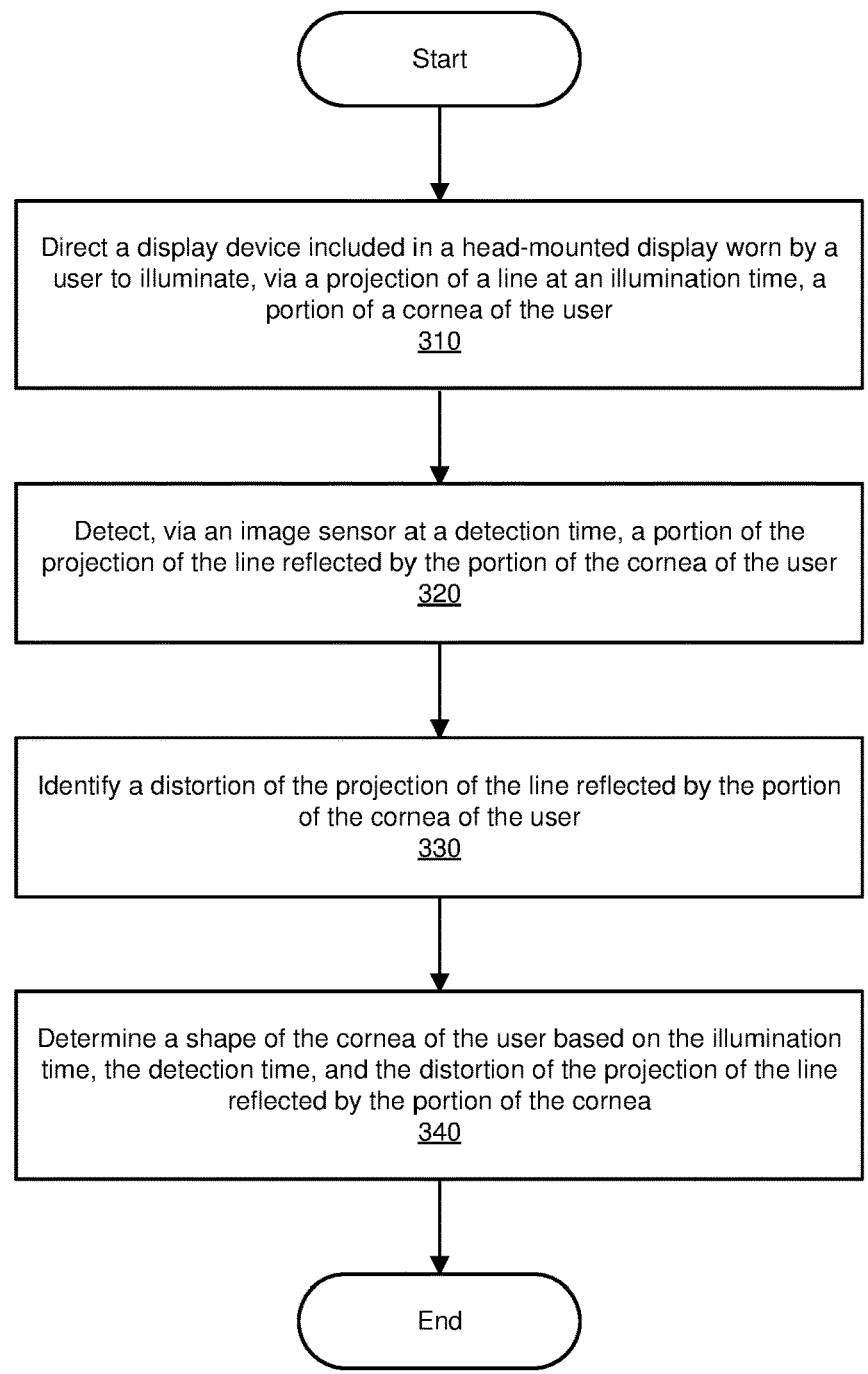
FIG. 3 is a flow diagram of an example method for mapping corneal curvature.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium. FIG. 3 is a flow diagram of an example computer-implemented method 300 for mapping corneal curvature. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may direct a display device included in a head-mounted display worn by a user to illuminate, via a projection of a line at an illumination time, a portion of a cornea of the user. For example, directing module 104 may, as part of control device 202, cause control device 202 to direct display device 142 included in head-mounted display 140 worn by a user to illuminate, via projection 206 at illumination time 208, a portion of cornea 204.

In some examples, a "projection of a line" may include any illumination that may be projected across a surface in accordance with a predetermined shape. In some examples, the projection of the line may include a straight, narrow band of light that may be projected against and may extend across a surface. In some examples, the projection of the line may have an aspect ratio greater than a threshold aspect ratio, such as 5:1, 10:1, 100:1, and so forth. In other words, in some examples, a projection of a line may have a substantially larger dimension along a first axis than along a second axis, and hence may approximate a one-dimensional line segment when projected against and/or across a two- or three-dimensional surface.

For example, as described above, display device 142 may include, in some embodiments, a rolling-shutter display. As with a rolling-shutter camera, a rolling-shutter display may scan an area of a display device (e.g., an array of pixels included in the display device) line-by-line over a period of time (e.g., 60 Hz, 90 Hz, 120 Hz, etc.). Directing Module 104 may, in accordance with a rolling-shutter action of display device 142, direct display device 142 to illuminate a single line of pixels included in display device 142 over one or more cycles of display device 142. The line of pixels may be arranged across a scan axis of display device 142 and may sweep across a display axis of display device 142. This may result in display device 142 projecting a projection of a line (e.g., projection 206) against a cornea 204.

Figure 4:
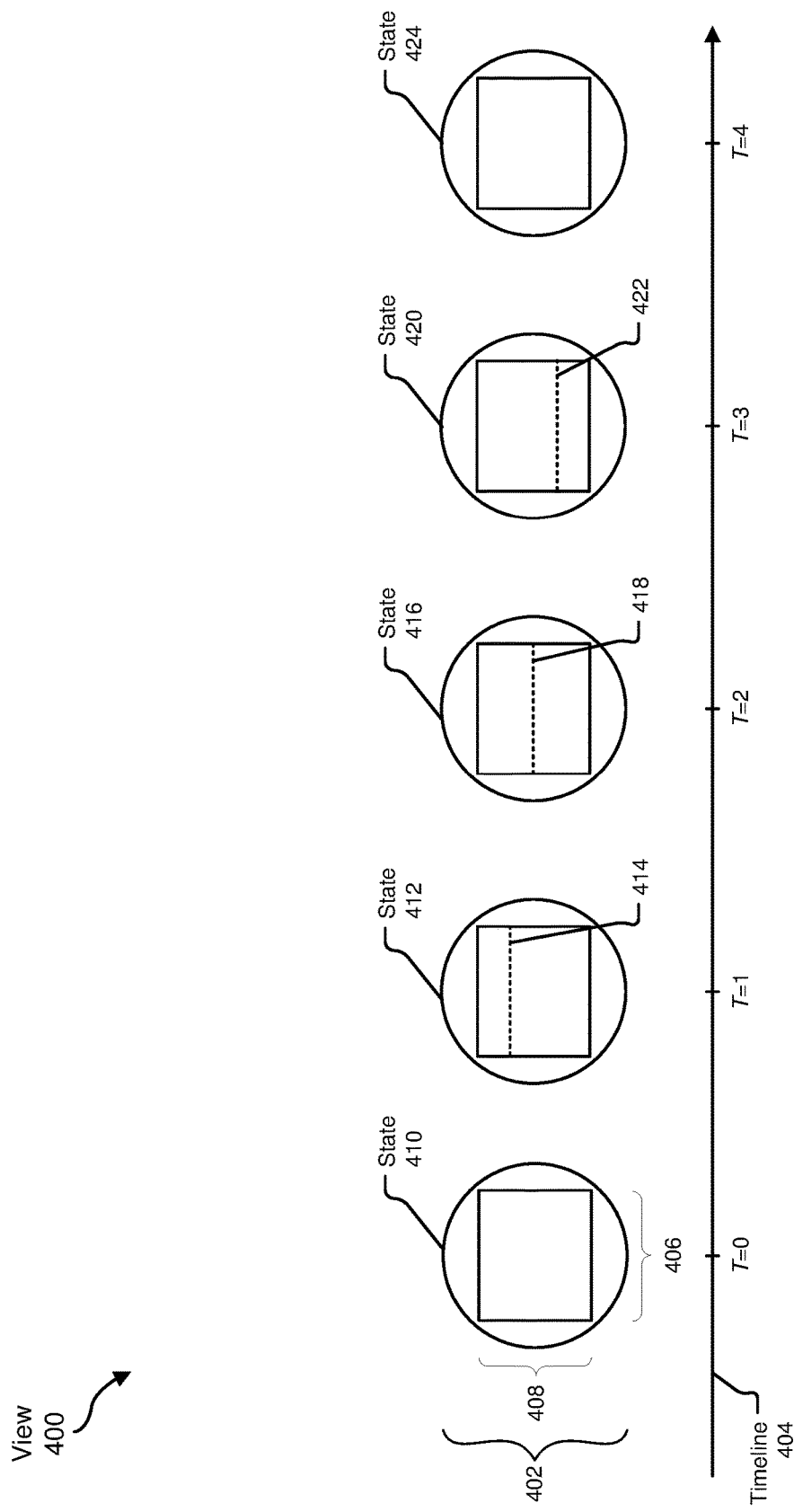
FIG. 4 is an illustration of a rolling shutter that may be used in connection with embodiments of this disclosure.

By way of illustration, FIG. 4 includes a view 400 of a progression of a rolling-shutter display 402 illuminating, over the course of a time shown by a timeline 404, a single row of pixels. As shown, rolling-shutter display 402 may include a scan axis 406 and a display axis 408. Timeline 404 may illustrate any suitable period of time, such as a refresh time for rolling-shutter display 402. As shown by state 410 of rolling-shutter display 402, at a starting time of T=0, directing module 104 may direct rolling-shutter display 402 to illuminate no pixels. At time T=1, as shown by state 412, directing module 104 may direct rolling-shutter display 402 to illuminate line of pixels 414. At time T=2, as shown by state 416, directing module 104 may direct rolling-shutter display 402 to illuminate line of pixels 418, which may be displaced from line of pixels 414 a distance along display axis 408. At time T=3, as shown by state 420, directing module 104 may direct rolling-shutter display 402 to illuminate line of pixels 422, which may be displaced from line of pixels 418 an additional distance along display axis 408. At time T=4, as shown by state 424, directing module 104 may have directed rolling-shutter display 402 to illuminate no pixels.

In additional or alternative embodiments, display device 142 may include an infrared line source, such as an infrared laser source. For example, in some embodiments, display device 142 may include a vertical-cavity surface-emitting laser (VCSEL) configured to emit a laser beam within an infrared range of the electromagnetic spectrum. Furthermore, display device 142 may include one or more optical elements that may form a line projection from light emitted from the infrared laser source, and may direct the line projection onto cornea 204. As an example, display device 142 may include a diffraction element that may diffract light from the infrared laser source into a line shape. As an additional example, display device 142 may include one or more microelectromechanical systems (MEMS) that may include one or more scanning micromirrors. The scanning micromirror may reflect light from the infrared laser source into a line shape and may project the line-shaped infrared light onto cornea 204. In additional embodiments, as will be described in additional detail below in reference to FIG. 8, display device 142 may illuminate cornea 204 with the projection of the line via an optical pathway of display device 142, such as a waveguide.

In some examples, as will be described in greater detail below in reference to FIGS. 6 and 7, directing module 104 may direct display device 142 to illuminate cornea 204 with projection 206 by directing display device 142 to pulse projection 206 in accordance with a predetermined pattern, such as a set of parallel lines having a predetermined spacing and/or a grid pattern with a predetermined pattern and/or spacing.

Returning to FIG. 3, at step 320, one or more of the systems described herein may detect, via an image sensor at a detection time, a portion of the projection of the line reflected by the portion of the cornea of the user. For example, detecting module 106 may, as part of control device 202, cause control device 202 to detect, via image sensor 150 at detection time 210, reflected projection 212.

Image sensor 150 may include any suitable sensor that may receive and/or detect light reflected by a cornea 204. For example, as mentioned above, image sensor 150 may include, without limitation, an event camera, a rolling-shutter camera, a global-shutter camera, an infrared camera, an ultraviolet camera, a thermal camera, a radar sensor, a sonar sensor, combinations of one or more of the same, and so forth.

As noted above, image sensor 150 may be positioned to receive light reflected by a cornea (e.g., cornea 204). In some embodiments, image sensor 150 may be separate and distinct from head-mounted display 140. In additional or alternative embodiments, image sensor 150 may be included as part of head-mounted display 140. For example, as shown in FIG. 2, image sensor 150 may be included in head-mounted display 140, such as disposed within a cavity or void formed by a housing of head-mounted display 140 and through which light reflected by a cornea 204 may pass. In such examples, image sensor 150 may receive light reflected by cornea 204 via the void or cavity formed by the housing of head-mounted display 140.

In additional or alternative embodiments, as will be described in greater detail below in reference to FIG. 8, image sensor 150 may be positioned to receive light reflected by a cornea (e.g., cornea 204) via an optical pathway of a display device (e.g., display device 142). For example, as described above, and as will be described in greater detail below in reference to FIG. 7, display device 142 may include a waveguide display. Image sensor 150 may be positioned such that light reflected by a cornea 204 may pass through and/or be conducted by a waveguide to a position where image sensor 150 may receive the reflected light.

Detecting module 106 may detect projection 206 in a variety of contexts. For example, as described above, directing module 104 may direct display device 142 to illuminate, via projection 206 at illumination time 208, at least a portion of cornea 204. Light included in projection 206 may be reflected by cornea 204 (e.g., as reflected projection 212), and detecting module 106 may detect reflected projection 212 via image sensor 150 by receiving data from image sensor 150 that may be representative of reflected projection 212 received and detected by image sensor 150.

Figure 5:
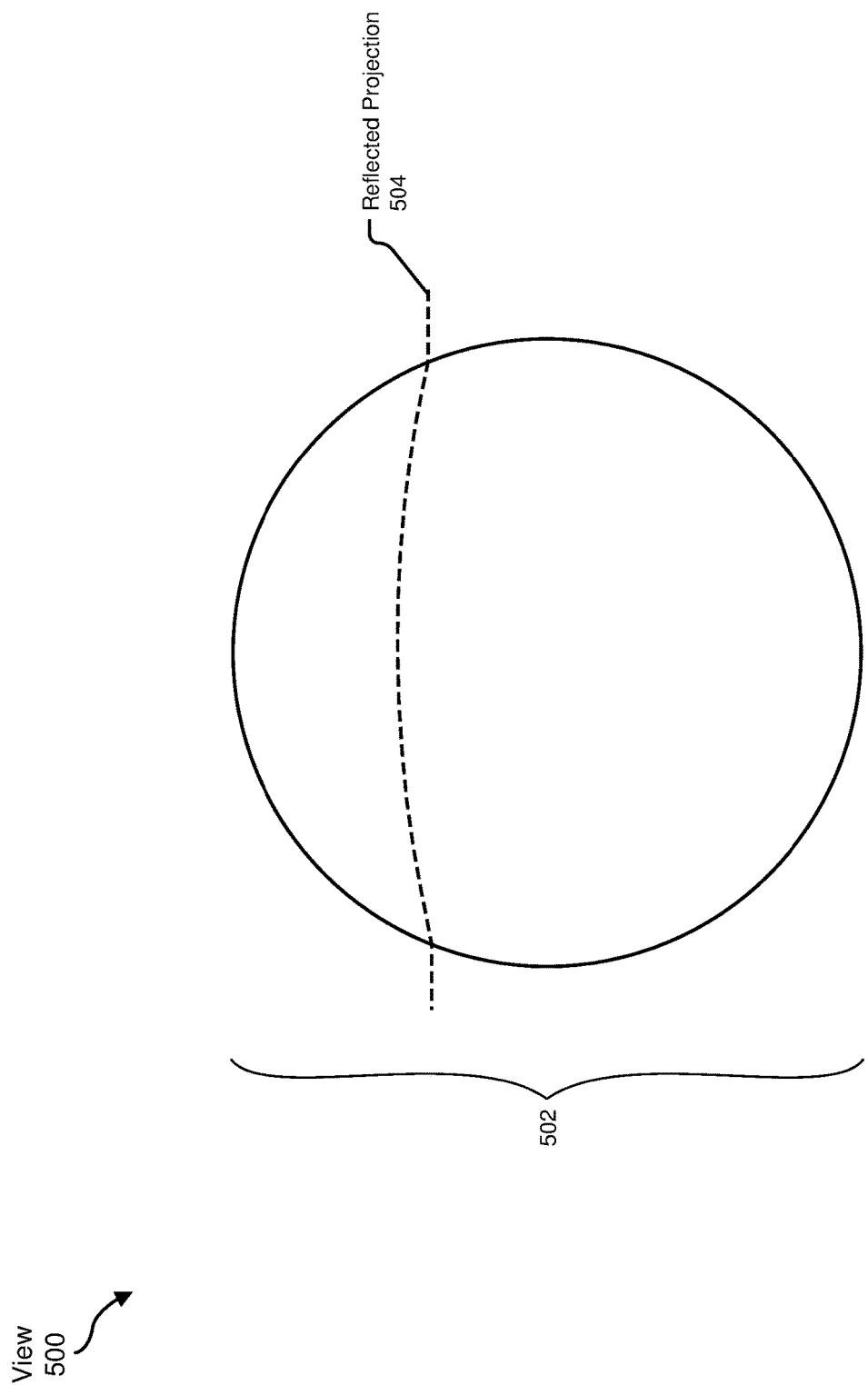
FIGS. 5-7 are illustrations of a corneas of users illuminated and/or mapped in accordance with embodiments of this disclosure.

By way of illustration, FIG. 5 includes a view 500 of a cornea 502. As shown, directing module 104 may direct a display device (e.g., display device 142) to illuminate, via a projection of a line (e.g., projection 206) at an illumination time (e.g., illumination time 208), at least a portion of cornea 502. Detecting module 106 may then detect, via an image sensor (e.g., image sensor 150) at a detection time (e.g., detection time 210), at least a portion of the projection of the line reflected by the portion of cornea 502, indicated in FIG. 5 as reflected projection 504. In some examples, detecting module 106 may correlate the illumination time (e.g., illumination time 208) and the detection time (e.g., detection time 210) to identify reflected projection 504, particularly in examples where the image sensor may detect light from sources other than reflected projection 504. This may also enable one or more of modules 102 (e.g., detecting module 106) to identify a pixel included in display device 142 that generated a portion of reflected projection 504.

In some examples, as mentioned above, directing module 104 may direct display device 142 to illuminate at least a portion of a cornea (e.g., cornea 204) by directing display device 142 to pulse the projection of the line in a predetermined pattern, such as a set of lines and/or a grid. For example, the predetermined pattern may include a plurality of parallel lines at a predetermined spacing. Detecting module 106 may then detect, via an image sensor (e.g., image sensor 150), a portion of the projection of the line reflected by the portion of the cornea of the user.

Figure 6:
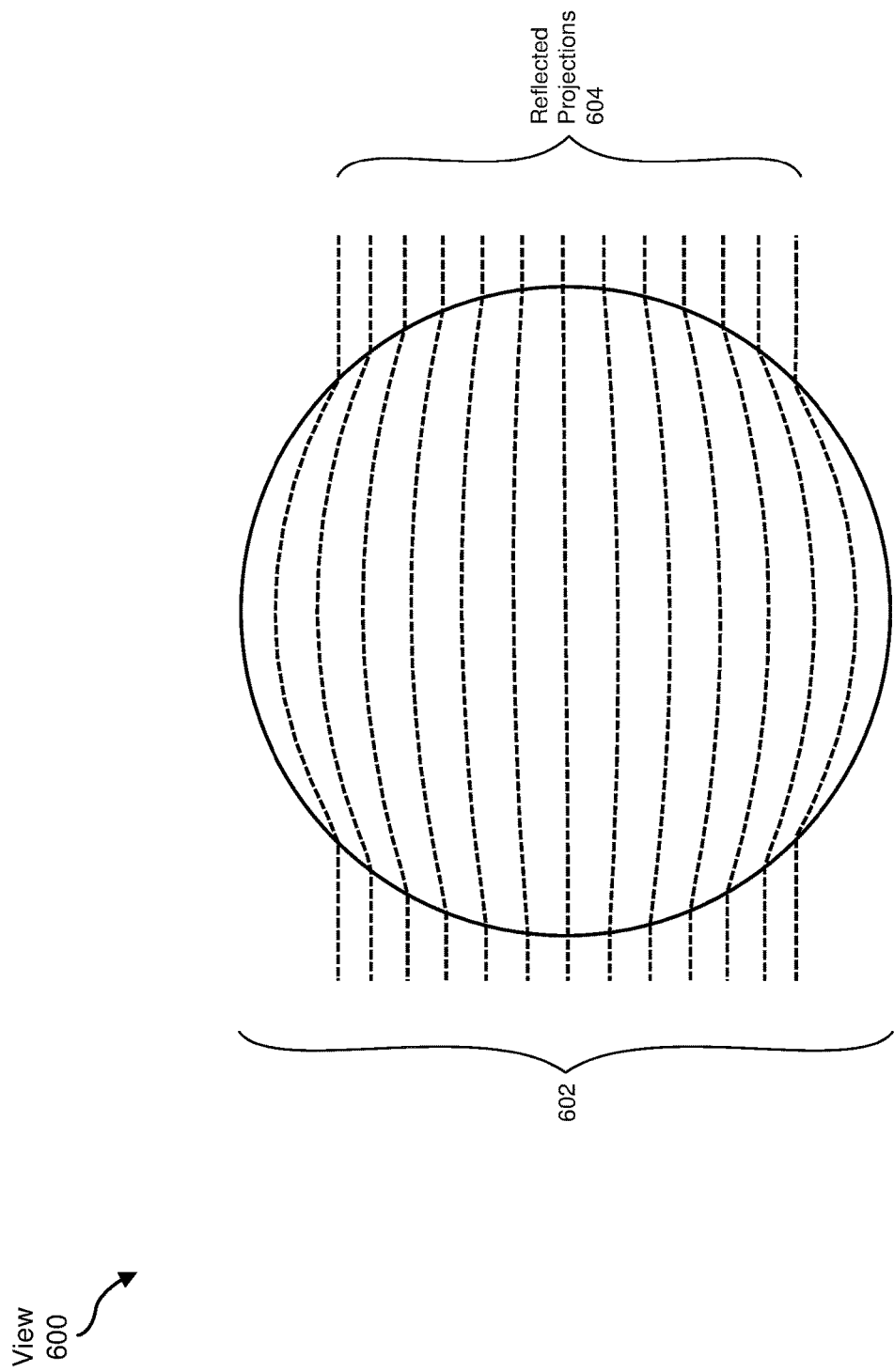
Figure 7:
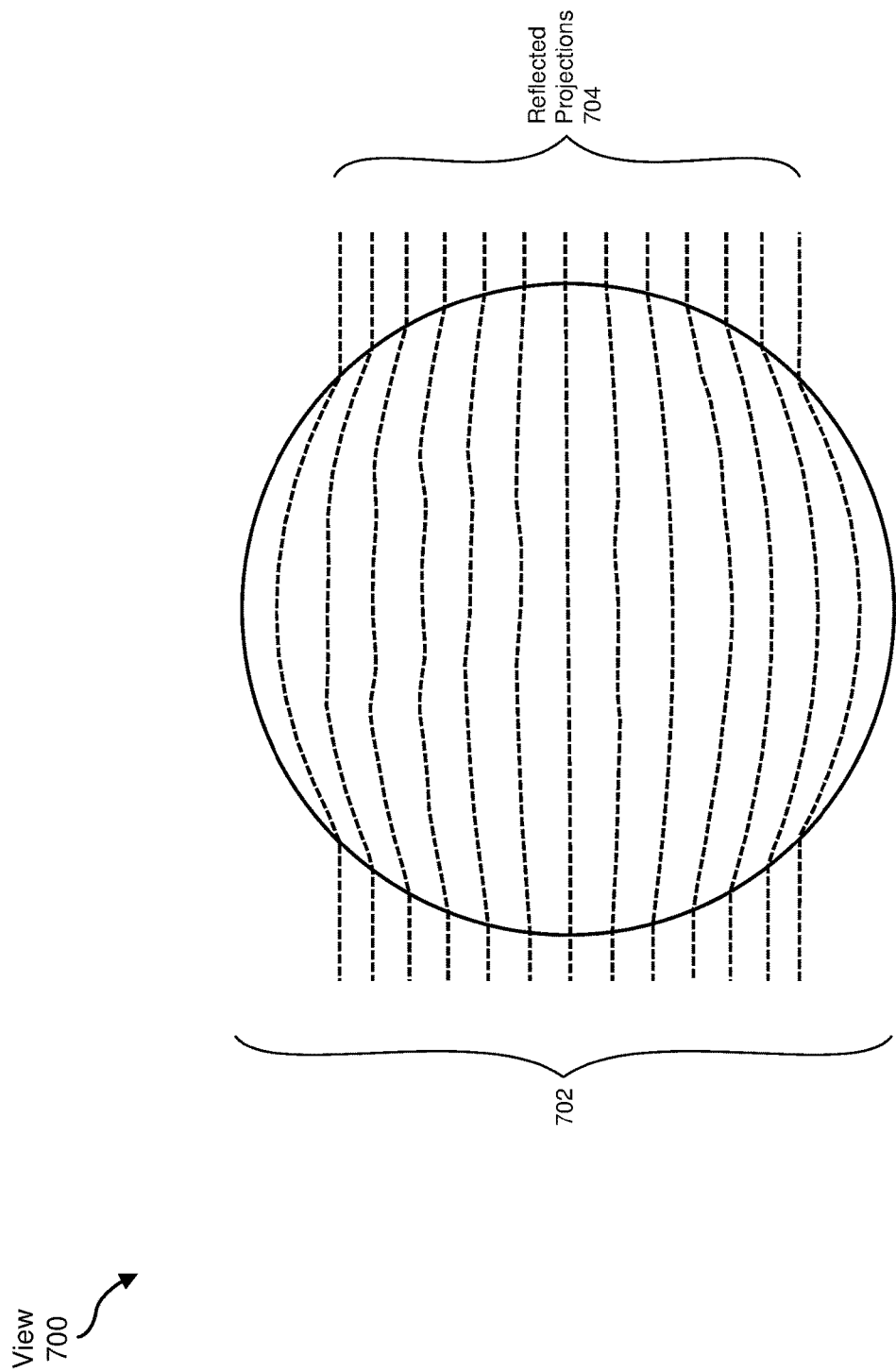

To illustrate, FIG. 6 includes a view 600 of a cornea 602. As shown, directing module 104 may direct a display device (e.g., display device 142) to illuminate at least a portion of cornea 602 by directing display device 142 to pulse the projection of the line in a plurality of parallel lines at a predetermined spacing. For example, in embodiments where display device 142 includes a rolling-shutter display that may scan an area of display device 142 (e.g., an array of pixels included in display device 142) line-by-line over a period of time, directing module 104 may direct display device 142 to pulse a line of pixels at predetermined locations within the area of display device 142 and/or at predetermined times during a cycle of the rolling-shutter display. This may result in multiple projections of the line illuminating portions of the cornea of the user during the cycle of the rolling-shutter display. At the end of such a cycle, a plurality of parallel projections of lines may have been projected via display device 142. Each projection of a line may be reflected by a different portion of the cornea (e.g., cornea 204, cornea 602, etc.), and may be detected by detecting module 106 via image sensor 150. Such reflections may be aggregated into a set of reflected projections 604.

In some embodiments, as described above, display device 142 may include an infrared light source (e.g., a VCSEL) that may be formed into a projection of a pattern (e.g., a projection of a line) via a suitable optical element, such as a MEMS micromirror device, a diffraction grating, and so forth. In some such embodiments, the infrared light source and/or the optical element may form the infrared light source into a projection of a plurality of parallel lines at a predetermined spacing. For example, the MEMS micromirror device may scan the infrared light source across a cornea (e.g., cornea 602) at the predetermined spacing. Additionally or alternatively, other suitable optical elements may, through reflection, diffraction, and/or refraction, cause the infrared light source to form a projection having any suitable shape or pattern, such as a projection of a plurality of parallel lines as in FIG. 6, a grid, and/or any other suitable predefined shape or pattern. Directing module 104 may then cause display device 142 to illuminate the cornea of the user via the projection.

Directing module 104 may direct display device 142 to illuminate the cornea via the projection in any suitable way, such as progressively (e.g., a portion or line at a time), or all at once. Detecting module 106 may then similarly detect, via an image sensor (e.g., image sensor 150) a portion of the projection that may be reflected by the cornea (e.g., cornea 204). Hence, in some examples, when directing module 104 directs an infrared light source included in a display device, as formed into a suitable projection of a line and/or set of lines, to illuminate a portion of a cornea of a user, detecting module 106 may detect one or more reflected projections similar in shape and/or appearance to reflected projection 504 in FIG. 5 and/or set of reflected projections 604 in FIG. 6.

Returning to FIG. 3, at step 330, one or more of the systems described herein may identify a distortion of the projection of the line reflected by the portion of the cornea of the user. For example, identifying module 108 may, as part of control device 202, cause control device 202 to identify distortion 214 of reflected projection 212 reflected by cornea 204.

In some examples, a "distortion" and/or a "distortion of the projection of the line reflected by the portion of the cornea of the user" may include any variation of a shape of the reflected portion of the projection of the line from a predetermined, predefined, or expected shape of the projection of the line. For example, as mentioned above, projection 206 may have a substantially two-dimensional, continuous, straight, and/or line-shaped appearance, whereas reflected projection 212, when detected via image sensor 150, may have, without limitation, a curved, jagged, wavy, discontinuous, or otherwise non-linear appearance.

Identifying Module 108 may identify distortion 214 of reflected projection 212 reflected by cornea 204 in a variety of contexts. For example, identifying module 108 may compare distortion 214 with a predetermined, predefined, and/or expected shape of projection 206 via any suitable image analysis system, algorithm, or technique. When a difference between the predetermined, predefined, and/or expected shape of projection 206 and reflected projection 212 is greater than a particular threshold, identifying module 108 may identify the difference as distortion 214.

For example, returning to FIG. 5, directing module 104 may direct a display device (e.g., display device 142) to illuminate, via a projection of a line (e.g., projection 206) at an illumination time (e.g., illumination time 208), cornea 502. Detecting module 106 may then detect, via an image sensor (e.g., image sensor 150) at a detection time (e.g., detection time 210), reflected projection 504. Identifying module 108 may then identify a distortion of the projection of the line reflected by the cornea of the user. For example, as shown in FIG. 5, reflected projection 504 includes a curve of light reflected by a portion of cornea 502. As projection 206 may have a substantially linear shape, identifying module 108 may identify a distortion in reflected projection 504 by determining a curvature of the curve of light included in reflected projection 504 (e.g., a curvature that may differentiate a shape of reflected projection 504 from a linear shape of projection 206).

As another example, returning to FIG. 6, as described above, directing module 104 may direct a display device (e.g., display device 142) to illuminate a set of portions of cornea 602 via a corresponding set of projections of lines. Detecting module 106 may detect a corresponding set of reflected projections 604 and identifying module 108 may identify a corresponding set of distortions of reflected projections 604.

Returning to FIG. 3, at step 340, one or more of the systems described herein may determine a shape of the cornea of the user based on the illumination time, the detection time, and the distortion of the projection of the line reflected by the portion of the cornea. For example, determining module 110 may, as part of control device 202, cause control device 202 to determine cornea shape 216 based on illumination time 208, detection time 210, and distortion 214 of reflected projection 212 reflected by cornea 204.

As display device 142 illuminates cornea 204 with projection 206, some of the light is reflected off the tear film-air interface like a mirror as reflected projection 212. The pattern or shape of reflected projection 212 may indicate a shape of an anterior surface of the portion of cornea 204 illuminated by projection 206. Hence, determining module 110 may determine a shape of cornea 204 based on distortion 214 of reflected projection 212 reflected by cornea 204. For example, as distortion 214 may indicate a shape of the portion of cornea 204 illuminated by projection 206, determining module 110 may determine a shape of a portion of cornea 204 by mapping distortion 214 of reflected projection 212 to the portion of cornea 204 illuminated by projection 206.

In some examples, determining module 110 may correlate the portion of cornea 204 illuminated by projection 206 based on illumination time 208 and detection time 210. For example, directing module 104 may direct display device 142 to illuminate a portion of cornea 204 with projection 206 at illumination time 208, and detecting module 106 may detect reflected projection 212 at detection time 210. Determining module 110 may determine that reflected projection 212 is associated with the portion of cornea 204 illuminated at illumination time 208 based on a correlation between illumination time 208 and detection time 210. In some examples, display device 142 and image sensor 150 may be synchronized and/or operate in accordance with the same timing mechanism in order to facilitate determining module 110 correlating and/or associating illumination time 208 with detection time 210.

Additionally or alternatively, in some examples, determining module 110 may identify a portion of display device 142 that generates and/or projects projection 206 based on illumination time 208. For example, in embodiments where display device 142 may include a rolling-shutter display, illumination time 208 may indicate which portion of display device 142 (e.g., which pixel or line of pixels) generated and/or projected projection 206. Determining module 110 may further determine an angle of reflection of projection 206 based on illumination time 208 and the identified portion of display device 142. Determining module 110 may then further determine cornea shape 216 based on the determined angle of reflection.

Returning to FIG. 5, directing module 104 may direct a display device (e.g., display device 142) to illuminate, via a projection of a line (e.g., projection 206) at an illumination time (e.g., illumination time 208) a portion of cornea 502. The projection of the line may reflect off a tear film-air interface associated with cornea 502 as reflected projection 504. Identifying module 108 may identify a distortion of the projection of the line reflected by the portion of cornea 502 illuminated by the projection of the line. A pattern or shape of reflected projection 504 may indicate a shape of the portion of cornea 502 illuminated by the projection of the line. Hence, determining module 110 may determine a shape of the portion of cornea 502 illuminated by the projection of the line based on the identified distortion of the projection of the line reflected by the portion of cornea 502. As shown in FIG. 5, a distortion of reflected projection 504 (i.e., a distortion from a straight shape of the projection of the line) may indicate a curved shape or contour of cornea 502 where cornea 502 is illuminated and/or intersected by the projection of the line.

Returning to FIG. 6, directing module 104 may direct a display device (e.g., display device 142) to illuminate at least a portion of cornea 602 by directing display device 142 to pulse the projection of the line in a plurality of parallel lines at a predetermined spacing. This may result in multiple projections of the line illuminating portions of the cornea of the user. Each projection of a line may be reflected by a different portion of the cornea (e.g., cornea 204, cornea 602, etc.), and may be detected by detecting module 106 via image sensor 150. Identifying module 108 may identify distortions of the projections reflected by different portions of cornea 602 and determining module 110 may determine a shape of cornea 602 based on the identified distortions in reflected projections 604. As shown in FIG. 6, patterns or shapes of reflected projections 604 may indicate a shape of an anterior surface of cornea 602. Determining module 110 may therefore determine a shape of cornea 602 based identified distortions in reflected projections 604.

In some examples, determining module 110 may identify one or more features within cornea shape 216. In some examples, a "feature" or "feature of a cornea shape" may include any identifiable portion of a set of data that may include information that may be relevant for an identification process to identify a particular cornea within a set of corneas (i.e., to identify cornea 204 within a set of corneas). In some examples, features may include specific structures included in and/or identified based on pixel data included in an image of distortion 214 and/or cornea shape 216, such as points, edges, lines, junctions, or objects. Additionally or alternatively, a feature may be described in terms of properties of a region of an image (e.g., a "blob"), a boundary between such regions, and/or may include a result of a feature detection algorithm applied to a set of data that describes cornea shape 216 (e.g., an image of cornea 204, an image of distortion 214, an image of cornea shape 216, etc.).

Examples of feature detection algorithms may include, without limitation, a Gabor filter, Hough transform, Harris corner detection, Features From Accelerated Segment Test (FAST), Laplacian of Gaussian, Difference of Gaussians, Determinant of Hessian, Maximally Stable Extremal Regions (MSER), Principal Curvature-Based Region Detector (PCBR), Gradient Location and Orientation Histogram (GLOH), intensity-based detectors, structure-based detectors, variations or combinations of one or more of the same, and so forth.

In some examples, embodiments of the apparatuses, systems, and methods described herein may include and/or enable additional functions. For example, in at least one embodiment, one or more of modules 102 (e.g., directing module 104, detecting module 106, identifying module 108, and/or determining module 110) may track a position of a cornea of a user (e.g., cornea 204) based on a shape of the cornea (e.g., cornea shape 216).

One or more of modules 102 may track a position of cornea 204 in a variety of contexts. For example, in accordance with the operations described above, determining module 110 may determine an initial shape of cornea 204 (e.g., cornea shape 216). Directing module 104 may then direct display device 142 to again illuminate, via an additional projection of an additional line at an additional illumination time, cornea 204. Detecting module 106 may then further detect, via image sensor 150 at an additional detection time, an additional portion of the additional line reflected by cornea 204 and identifying module 108 may identify an additional distortion of the projection of the line reflected by cornea 204. Determining module 110 may then determine an additional shape of cornea 204 based on the additional illumination time, the additional detection time, and the additional distortion.

Determining module 110 may then compare the additional shape to the initial shape and, based on the comparison, determine a change in a position of cornea 204. One or more components of example system 100 and/or example system 200 may execute this process with any suitable frequency (e.g., 1 time per second, 10 times per second, 100 times per second, etc.) to track a position of cornea 204.

Furthermore, individual corneas may have biometric characteristics that may distinguish one cornea from another. For example, FIG. 7 shows a view 700 of an additional cornea 702 that may have a different shape (e.g., a different topology) than cornea 602. The apparatuses, systems, and methods described herein may be used to determine a shape of cornea 702. For example, directing module 104 may direct a display device (e.g., display device 142) to illuminate, via one or more projections of one or more lines (e.g., projection 206), one or more portions of cornea 702. Detecting module 106 may detect reflected projections 704 reflected by portions of cornea 702 and identifying module 108 may identify one or more distortions of reflected projections 704. Determining module 110 may then determine a shape of cornea 702 based on distortions included in reflected projections 704. As may be apparent via a comparison of reflected projections 604 and reflected projections 704, cornea 602 may have a different shape (e.g., a different topology) from cornea 602. Based on this difference, one or more of modules 102 (e.g., determining module 110) may identify cornea 702 as being a different cornea than cornea 602.

In additional or alternative examples, embodiments of the apparatuses, systems, and methods described herein may identify a user based on a shape of the user's cornea. For example, as described above, determining module 110 may determine cornea shape 216 of cornea 204 based on illumination time 208, detection time 210, and distortion 214. One or more of modules 102 (e.g., determining module 110) may then compare cornea shape 216 to a set of predetermined cornea shapes that may be associated with one or more users. Based on that comparison, one or more of modules 102 (e.g., determining module 110) may identify a user associated with cornea 204.

One or more of modules 102 may compare cornea shape 216 to the set of predetermined cornea shapes in any suitable way. For example, as described above as part of the process of determining cornea shape 216 of cornea 204, determining module 110 may identify one or features within cornea shape 216. Determining module 110 may compare the identified features included in cornea shape 216 with features identified within one or more predetermined cornea shapes. Determining module 110 may then identify a cornea from the one or more predetermined cornea shapes that may share one or more features with cornea shape 216. Based on this identification of the cornea from the one or more predetermined cornea shapes, determining module 110 may identify a user associated with the identified cornea, and therefore identify a user associated with cornea 204.

In additional or alternative embodiments, one or more of modules 102 (e.g., determining module 110) may determine, based on cornea shape 216, a condition associated with cornea 204, such as astigmatism, keratitis, keratoconus, and/or a cornea dystrophy. For example, a predetermined cornea shape may be associated with one or more conditions of a cornea. One or more of modules 102 (e.g., determining module 110) may compare cornea shape 216 to one or more predetermined cornea shapes (e.g., via any suitable comparison method) that may indicate one or more corneal conditions. When cornea shape 216 is within a threshold degree of similarity to a predetermined corneal shape that may indicate a particular condition, determining module 110 may determine that cornea 204 has a shape associated with the particular condition.

As mentioned above, in some examples, display device 142 may include a waveguide display. In some examples, display device 142 may illuminate cornea 204 via an optical pathway of the waveguide display and/or image sensor 150 may receive light reflected by cornea 204 via the optical pathway of the waveguide display.

Figure 8:
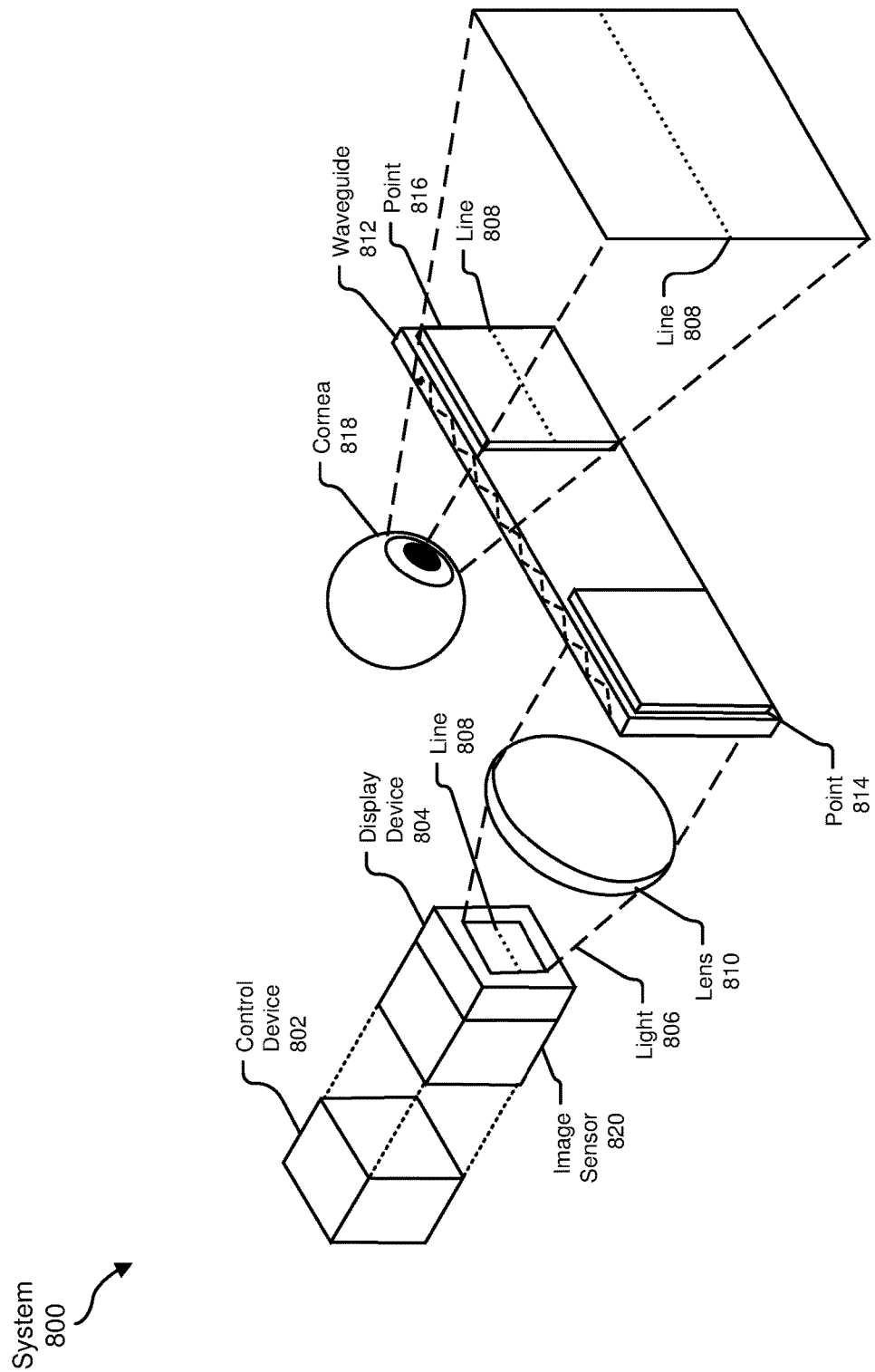
FIG. 8 is an illustration of a waveguide display in accordance with embodiments of this disclosure.

To illustrate, FIG. 8 is a block diagram of an example system 800 that includes a waveguide display. As shown, example system 800 includes a control device 802 that may perform any of the operations described herein associated with control device 202. Example system 800 may also include a display device 804 that may include any of the display devices included herein. For example, display device 804 may include a rolling-shutter display or a global-shutter display. In additional examples, display device 804 may include an infrared light source, such as an infrared VCSEL, and a MEMS micromirror device that may be configured to scan the infrared light source across a surface (e.g., a cornea).

Display device 804 may generate and/or produce light 806 that may include a projection of a line 808. Light 806 and/or the projection of line 808 may pass through a lens 810, which may represent one or more optical elements that may direct light 806 into waveguide 812. Waveguide 812 may include any suitable waveguide that may guide waves in a portion of the electromagnetic spectrum from a first point (e.g., point 814) to a second point (e.g., point 816) via any suitable mechanism, such as internal reflection, Bragg reflection, and so forth. Hence, waveguide 812 may guide light from point 814 to point 816 and/or from point 816 to point 814. Light may exit waveguide 812 at point 816, and waveguide 812 and/or any other suitable optical elements (e.g., a combiner lens) may direct the light towards a cornea of a user, such as cornea 818. Likewise, light may exit waveguide 812 at point 814, and waveguide 812 may direct the exiting light toward an image sensor 820 (e.g., via lens 810). As described above, image sensor 820 may include any suitable image sensor such as an event camera, a rolling-shutter camera, and/or a global shutter camera.

Hence, directing module 104 may direct display device 804 to illuminate, via a projection of a line (e.g., line 808), at an illumination time, a portion of a cornea of a user by directing display device 804 to generate and/or produce a projection of a line and direct the projection of the line toward point 814 of waveguide 812. Light that includes the projection of the line (e.g., light 806 that may include line 808) may enter waveguide 812, and waveguide 812 may guide the light toward point 816. Upon exiting waveguide 812 at point 816, line 808 may illuminate at least a portion of cornea 818.

Furthermore, cornea 818 may reflect light from the projection of line 808 back into waveguide 812 at point 816. Waveguide 812 may guide the reflected light toward point 814, where the reflected light may exit waveguide 812 and/or pass into lens 810. Lens 810 may direct the reflected light toward image sensor 820. Detecting module 106 may therefore detect, via image sensor 820 at a detection time, a portion of the projection of line 808 reflected by cornea 818. Identifying module 108 may identify a distortion of the projection of line 808 reflected by the portion of cornea 818 in any of the ways described herein and determining module 110 may determine a shape of cornea 818 in any of the ways described herein. Additional examples of waveguides and/or waveguide displays may be described below in reference to FIGS. 10-11.

As discussed throughout the instant disclosure, the disclosed systems and methods may provide one or more advantages over standard or conventional head-mounted displays. For example, by directing a display device that includes a rolling-shutter display to illuminate a portion of a cornea of a user with a projection of a line as described herein, the projection of the line may sweep the cornea in angular space. In some examples, a suitable rolling-shutter display may be included in a head-mounted display. Additionally or alternatively, other swept light sources (e.g., a swept infrared light source) may be included as part of the display device and may be used along with or instead of a rolling-shutter display to illuminate the cornea of the user with a projection of a line.

A reflection of the projection of the line may be distorted by the shape of the cornea, and hence may indicate a shape of the cornea. Embodiments of the apparatuses, systems, and methods described herein may detect, via an image sensor, a portion of the projection of the line reflected by the cornea (i.e., a tear-film interface of the cornea) and may identify a distortion of the reflected line. In some examples, the image sensor may include an event camera, a rolling-shutter camera, and/or a global shutter camera.

Furthermore, the apparatuses, systems, and methods described herein may enable a suitably equipped head-mounted display to determine a shape of the cornea of a user based on the distortion of the reflected line. In some examples, these apparatuses, systems, and methods may be used to biometrically identify the user based on the determined cornea shape. In additional or alternative examples, these methods may be performed in a repeated or periodic fashion in order to track a position of the cornea of a user and/or a gaze of the user over time. Moreover, in some embodiments, the apparatuses, systems, and methods described herein may aid in detection and/or diagnosis of medical conditions related to a shape of a patient's cornea, such as astigmatism, keratitis, keratoconus, and/or a cornea dystrophy.

Example Embodiments

Example 1: Example 1: A computer-implemented method comprising (1) directing a display device included in a head-mounted display worn by a user to illuminate, via a projection of a line at an illumination time, a portion of a cornea of the user, (2) detecting, via an image sensor at a detection time, a portion of the projection of the line reflected by the portion of the cornea of the user, (3) identifying a distortion of the projection of the line reflected by the portion of the cornea of the user, and (4) determining a shape of the cornea of the user based on the illumination time, the detection time, and the distortion of the projection of the line reflected by the portion of the cornea.

Example 2: The computer-implemented method of example 1, wherein the image sensor comprises an event camera.

Example 3: The computer-implemented method of any of examples 1 and 2, wherein the image sensor comprises at least one of (1) a global-shutter camera, or (2) a rolling-shutter camera.

Example 4: The computer-implemented method of any of examples 1-3, wherein the display device comprises a waveguide display.

Example 5: The computer-implemented method of any of examples 1-4, wherein the display device comprises a rolling-shutter display comprising a scan axis and a display axis.

Example 6: The computer-implemented method of example 5, wherein directing the display device to illuminate the portion of the cornea of the user with the projection of the line comprises directing the rolling-shutter display to illuminate at least one line of pixels arranged along the display axis of the rolling-shutter display.

Example 7: The computer-implemented method of any of examples 1-6, wherein the display device further comprises an infrared light source.

Example 8: The computer-implemented method of example 7, wherein the infrared light source illuminates the portion of the cornea with the projection of the line via an optical pathway of the display device.

Example 9: The computer-implemented method of any of examples 1-8, wherein directing the display device to illuminate the portion of the cornea of the user comprises directing the display device to pulse the projection of the line in a predetermined pattern.

Example 10: The computer-implemented method of any of examples 1-9, wherein (1) the portion of the projection of the line reflected by the portion of the cornea of the user comprises a curve of light reflected by the portion of the cornea of the user, and (2) identifying the distortion of the projection of the line reflected by the portion of the cornea of the user comprises determining a curvature of the curve of light.

Example 11: The computer-implemented method of any of examples 1-10, further comprising tracking a position of the cornea based on the shape of the cornea.

Example 12: The computer-implemented method of any of examples 1-11, further comprising identifying the user based on the shape of the cornea.

Example 13: An apparatus comprising (1) a display device included in a head-mounted display (HMD) and positioned to illuminate a portion of a cornea of a user when the HMD is worn by the user, (2) an image sensor positioned to receive light reflected by the cornea, and (3) a control device that (a) directs the display device to illuminate, via a projection of a line at an illumination time, the portion of a cornea of the user, (b) detects, via the image sensor at a detection time, a portion of the projection of the line reflected by the portion of the cornea of the user, (c) identifies a distortion of the projection of the line reflected by the portion of the cornea of the user, and (d) determines a shape of the cornea of the user based on the illumination time, the detection time, and the distortion of the projection of the line reflected by the portion of the cornea.

Example 14: The apparatus of example 13, wherein the image sensor comprises an event camera.

Example 15: The apparatus of any of examples 13 and 14, wherein the image sensor comprises at least one of (1) a global-shutter camera, or (2) a rolling-shutter camera.

Example 16: The apparatus of any of examples 13-15, wherein the display device comprises a waveguide display.

Example 17: The apparatus of any of examples 13-16, wherein (1) the display device comprises a rolling-shutter display comprising a scan axis and a display axis, and (2) the control device further directs the display device to illuminate the cornea of the user with the projection of the line by directing the rolling-shutter display to illuminate at least one line of pixels arranged along the display axis of the rolling-shutter display.

Example 18: The apparatus of any of examples 13-17, wherein (1) the display device further comprises an infrared light source configured to illuminate the cornea with the projection of the line via an optical pathway of the display device, and (2) the control device directs the infrared light source to illuminate the cornea of the user by directing the infrared light source to pulse the projection of the line in a predetermined pattern.

Example 19: The apparatus of any of examples 13-18, wherein the control device further tracks a position of the cornea based on the shape of the cornea.

Example 20: A non-transitory computer-readable medium comprising computer-readable instructions that, when executed by at least one processor of a computing system, cause the computing system to (1) direct a display device included in a head-mounted display worn by a user to illuminate, via a projection of a line at an illumination time, a portion of a cornea of the user, (2) detect, via an image sensor at a detection time, a portion of the projection of the line reflected by the portion of the cornea of the user, (3) identify a distortion of the projection of the line reflected by the portion of the cornea of the user, and (4) determine a shape of the cornea of the user based on the illumination time, the detection time, and the distortion of the projection of the line reflected by the portion of the cornea.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
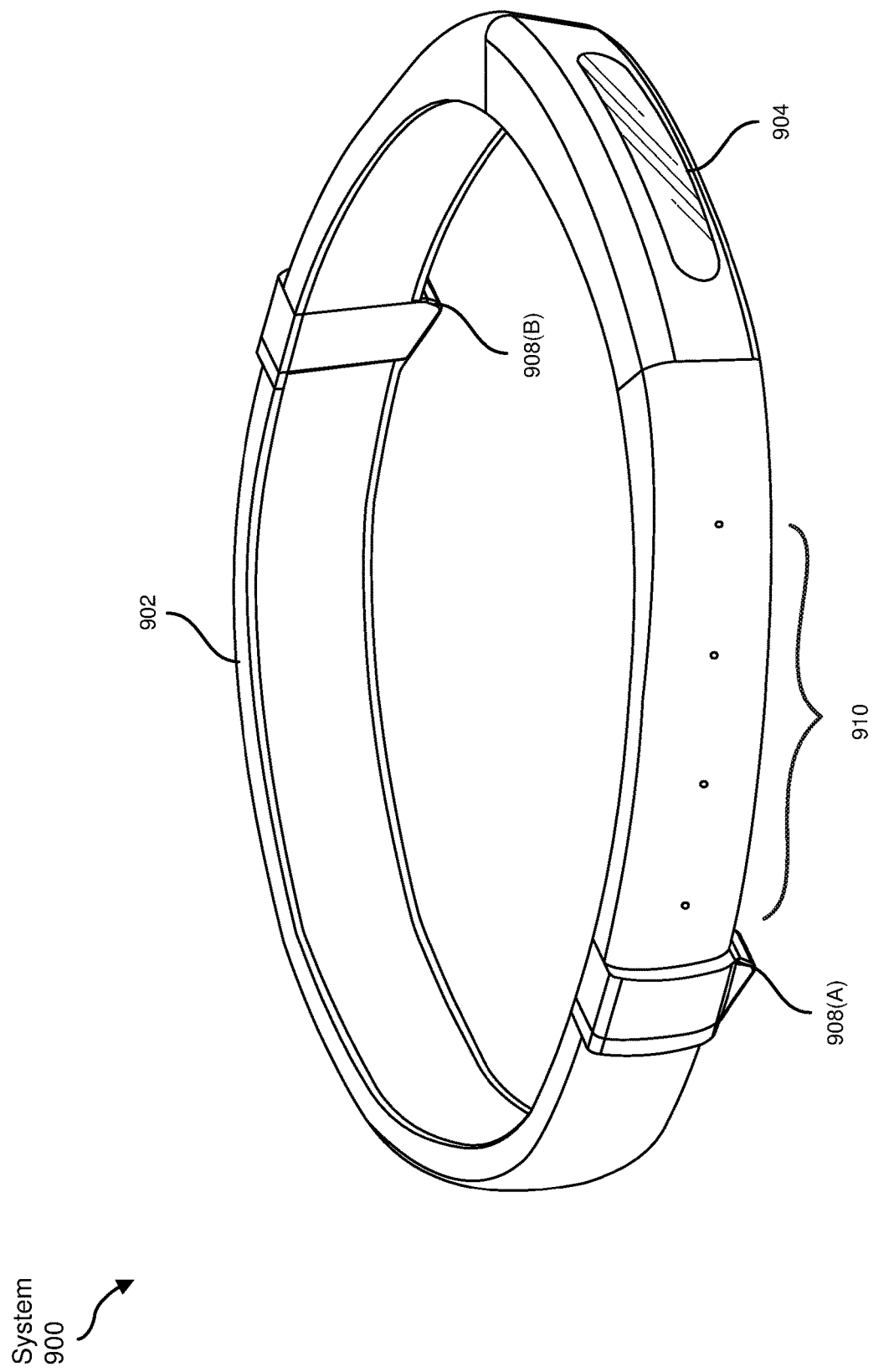
FIG. 9 is an illustration of an example artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
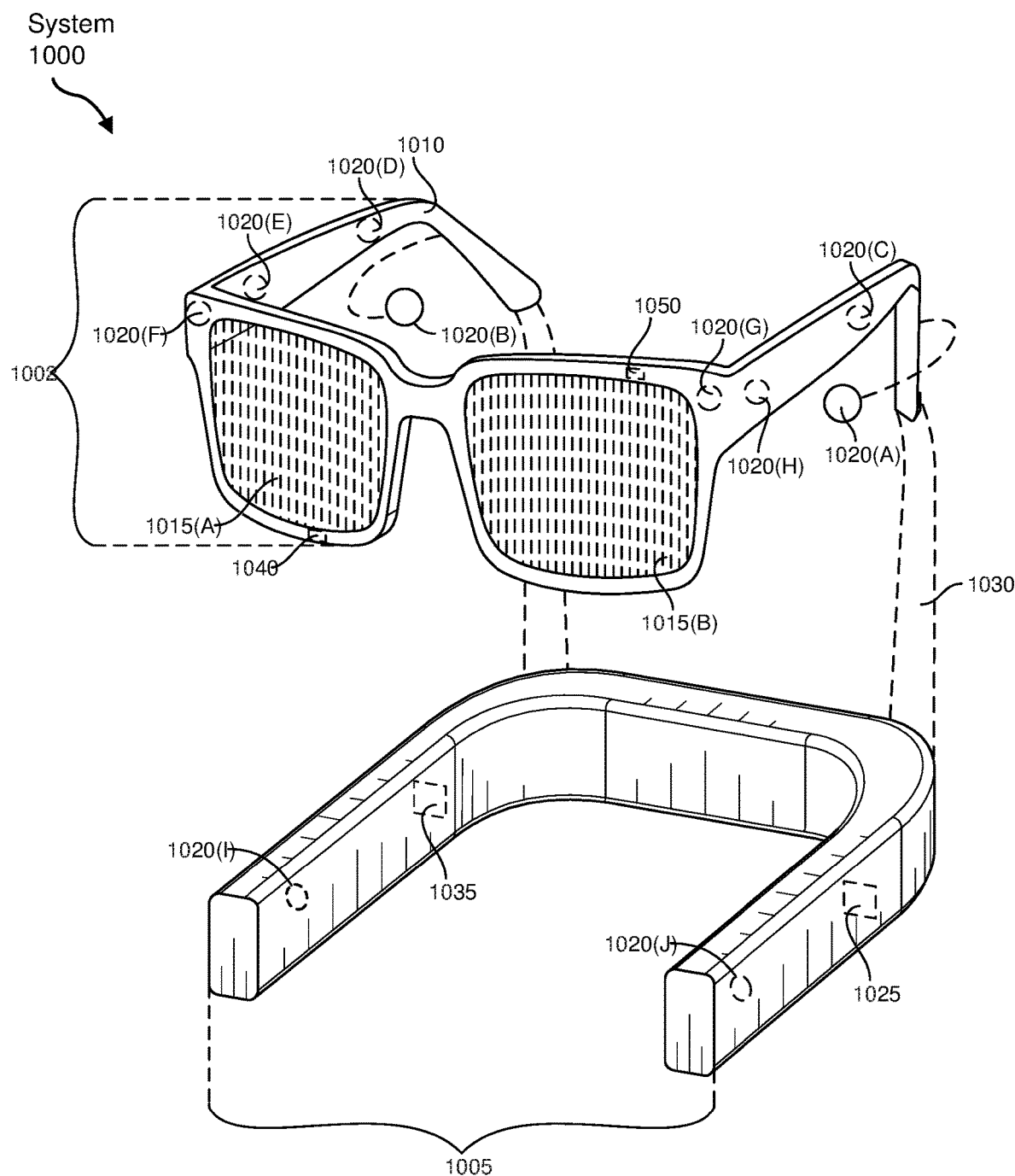
FIG. 10 is an illustration of example augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020 (A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020 (H), which may be positioned at various locations on frame 1010, and/or acoustic transducers 1020(1) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/ or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
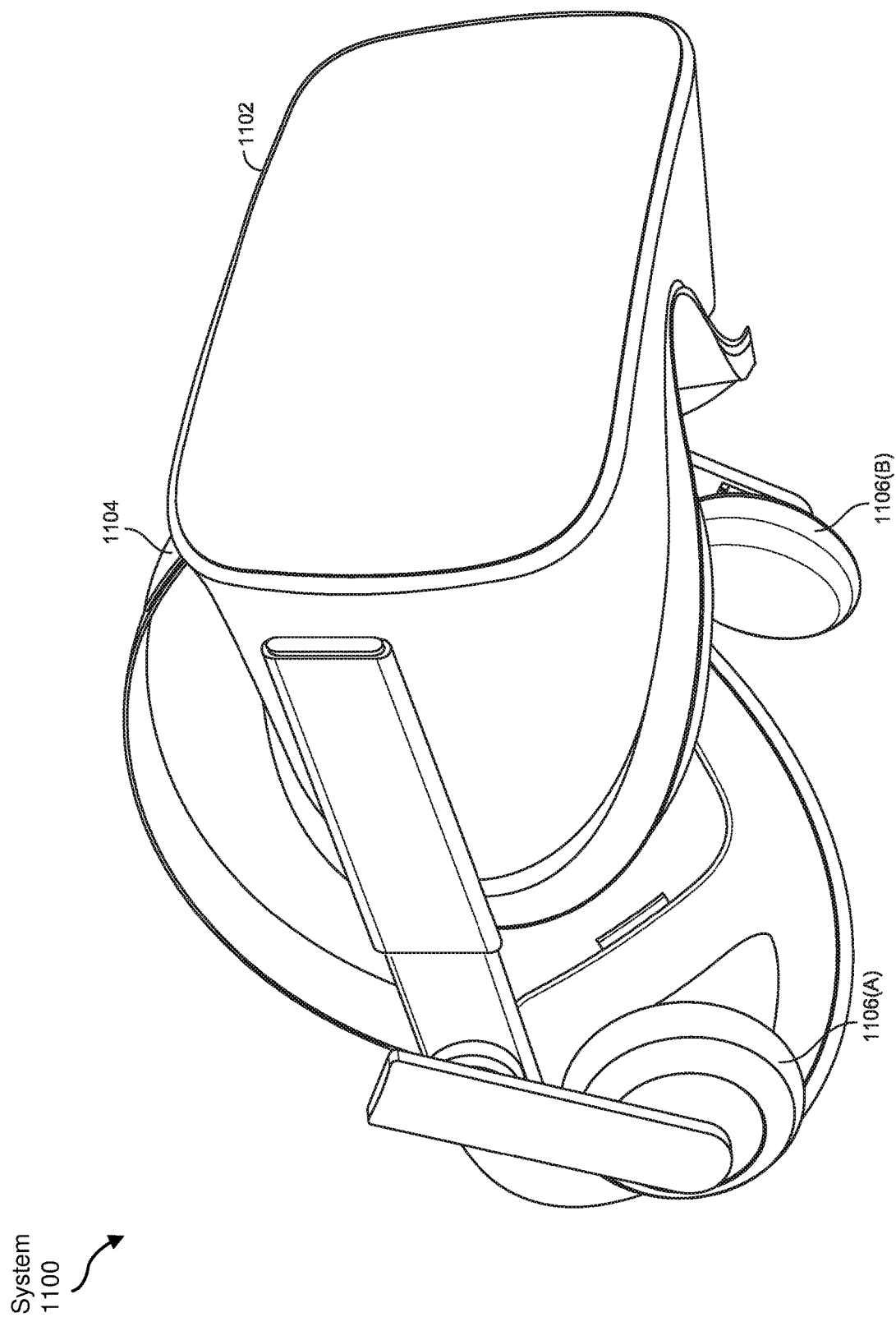
FIG. 11 is an illustration of an example virtual-reality headset that may be used in connection with embodiments of this disclosure.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image sensor data to be transformed, transform the image sensor data, output a result of the transformation to determine a shape of a cornea of a user, use the result of the transformation to determine the shape of the cornea of the user, and store the result of the transformation to track the cornea of the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    directing a rolling-shutter display device included in a head-mounted display worn by a user to illuminate, at an illumination time, via a projection of a line generated by the display device in accordance with a rolling-shutter action of the display device, a portion of a cornea of the user;
    detecting, via an image sensor at a detection time, a portion of the projection of the line reflected by the portion of the cornea of the user;
    identifying a distortion of the projection of the line reflected by the portion of the cornea of the user; and
    determining a shape of the cornea of the user based on the illumination time, the detection time, and the distortion of the projection of the line reflected by the portion of the cornea.

2. The computer-implemented method of claim 1, wherein the image sensor comprises an event camera.

3. The computer-implemented method of claim 1, wherein the image sensor comprises at least one of:
    a global-shutter camera; or
    a rolling-shutter camera.

4. The computer-implemented method of claim 1, wherein the display device comprises a waveguide display.

5. The computer-implemented method of claim 1, wherein the display device comprises a scan axis and a display axis.

6. The computer-implemented method of claim 5, wherein directing the display device to illuminate the portion of the cornea of the user with the projection of the line comprises directing the rolling-shutter display device to illuminate at least one line of pixels arranged along the display axis of the rolling-shutter display device.

7. The computer-implemented method of claim 1, wherein the display device further comprises an infrared light source.

8. The computer-implemented method of claim 7, wherein the infrared light source illuminates the portion of the cornea with the projection of the line via an optical pathway of the display device.

9. The computer-implemented method of claim 1, wherein directing the display device to illuminate the portion of the cornea of the user comprises directing the display device to pulse the projection of the line in a predetermined pattern.

10. The computer-implemented method of claim 1, wherein:
    the portion of the projection of the line reflected by the portion of the cornea of the user comprises a curve of light reflected by the portion of the cornea of the user; and
    identifying the distortion of the projection of the line reflected by the portion of the cornea of the user comprises determining a curvature of the curve of light.

11. The computer-implemented method of claim 1, further comprising tracking a position of the cornea based on the shape of the cornea.

12. The computer-implemented method of claim 1, further comprising identifying the user based on the shape of the cornea.

13. An apparatus comprising:
    a rolling-shutter display device included in a head-mounted display (HMD) and positioned to illuminate a portion of a cornea of a user when the HMD is worn by the user;
    an image sensor positioned to receive light reflected by the cornea; and
    a control device that:
        directs the display device to illuminate, at an illumination time, via a projection of a line generated by the display device in accordance with a rolling-shutter action of the display device, the portion of a cornea of the user;
        detects, via the image sensor at a detection time, a portion of the projection of the line reflected by the portion of the cornea of the user;
        identifies a distortion of the projection of the line reflected by the portion of the cornea of the user; and
        determines a shape of the cornea of the user based on the illumination time, the detection time, and the distortion of the projection of the line reflected by the portion of the cornea.

14. The apparatus of claim 13, wherein the image sensor comprises an event camera.

15. The apparatus of claim 13, wherein the image sensor comprises at least one of:
    a global-shutter camera; or
    a rolling-shutter camera.

16. The apparatus of claim 13, wherein the display device comprises a waveguide display.

17. The apparatus of claim 13, wherein:
    the display device comprises a scan axis and a display axis; and
    the control device further directs the display device to illuminate the portion of a cornea of the user via the projection of the line generated by the display device in accordance with the rolling-shutter action of the display device by directing the rolling-shutter display to illuminate at least one line of pixels arranged along the display axis of the display device.

18. The apparatus of claim 13, wherein:

the display device further comprises an infrared light source configured to illuminate the cornea with the projection of the line via an optical pathway of the display device; and the control device directs the infrared light source to illuminate the cornea of the user by directing the infrared light source to pulse the projection of the line in a predetermined pattern.

19. The apparatus of claim 13, wherein the control device further tracks a position of the cornea based on the shape of the cornea.

20. A non-transitory computer-readable medium comprising computer-readable instructions that, when executed by at least one processor of a computing system, cause the computing system to:

direct a rolling-shutter display device included in a head-mounted display worn by a user to illuminate, at an illumination time, via a projection of a line generated by the display device in accordance with a rolling-shutter action of the display device, a portion of a cornea of the user;

detect, via an image sensor at a detection time, a portion of the projection of the line reflected by the portion of the cornea of the user;

identify a distortion of the projection of the line reflected by the portion of the cornea of the user; and determine a shape of the cornea of the user based on the illumination time, the detection time, and the distortion of the projection of the line reflected by the portion of the cornea.

\* \* \* \* \*